United States Patent
Shinde et al.

(10) Patent No.: US 12,398,671 B2
(45) Date of Patent: Aug. 26, 2025

(54) COMPRESSOR ASSEMBLY FOR A GAS TURBINE ENGINE HAVING MULTI-STAGE BLEED EXTRACTION

(71) Applicant: General Electric Company, Evendale, OH (US)

(72) Inventors: Kudum Shinde, Bengaluru (IN); Mohan Kannaiah Raju, Bengaluru (IN); Hrishi Ragesh, Bengaluru (IN); Ton Thu Lang Giang, Liberty Township, OH (US); Steven Douglas Johnson, Milford, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/800,415

(22) Filed: Aug. 12, 2024

(65) Prior Publication Data

US 2025/0250931 A1    Aug. 7, 2025

(30) Foreign Application Priority Data

Feb. 2, 2024    (IN) .............................. 202411007088

(51) Int. Cl.
  *F02C 7/18*    (2006.01)
  *F02C 6/08*    (2006.01)
  *F02C 7/32*    (2006.01)

(52) U.S. Cl.
  CPC ................. *F02C 6/08* (2013.01); *F02C 7/18* (2013.01); *F02C 7/32* (2013.01)

(58) Field of Classification Search
  CPC .......... F01D 25/12; F01D 25/14; F01D 25/24; F01D 25/26; F02K 3/02; F02C 7/06; F02C 9/52; F02C 9/18; F02C 7/18; F02C 6/08
  See application file for complete search history.

(56) References Cited

U.S. PATENT DOCUMENTS

| | | | |
|---|---|---|---|
| 4,688,745 A | | 8/1987 | Rosenthal |
| 5,059,093 A | * | 10/1991 | Khalid .................. F04D 29/522 |
| | | | 415/115 |
| 5,351,478 A | * | 10/1994 | Walker .................. F04D 29/522 |
| | | | 60/785 |
| 6,550,254 B2 | | 4/2003 | Proctor et al. |
| 8,024,935 B2 | | 9/2011 | Hoover et al. |
| 8,381,532 B2 | | 2/2013 | Berry |

(Continued)

*Primary Examiner* — Devon C Kramer
*Assistant Examiner* — Rodolphe Andre Chabreyrie
(74) *Attorney, Agent, or Firm* — McCarter & English, LLP

(57) ABSTRACT

A compressor assembly includes a compressor casing, a blade row inside the compressor casing, first and second bleed cavities defined at first and second axial locations in the compressor casing with the second axial location at least partially overlapping the first axial location in an axial direction, and first and second bleed scoops defining first and second inlets to first and second bleed cavities, respectively. The first bleed scoop extends from a first compressor stage to the first bleed cavity to direct compressed air from the first compressor stage through the first inlet and into the first bleed cavity. The second bleed scoop defines a second inlet to the second bleed cavity. The second bleed scoop extends from a second compressor stage to the second bleed cavity to direct compressed air from the second compressor stage through the second inlet and into the second bleed cavity.

15 Claims, 8 Drawing Sheets

(56) References Cited

U.S. PATENT DOCUMENTS

| | | | |
|---|---|---|---|
| 8,388,308 B2* | 3/2013 | Karafillis | F01D 17/105 |
| | | | 415/169.1 |
| 10,125,781 B2 | 11/2018 | Klasing et al. | |
| 10,794,295 B2 | 10/2020 | Schwarz | |
| 10,814,988 B2 | 10/2020 | Bruno et al. | |
| 12,078,105 B2* | 9/2024 | Dhaka | F02C 7/18 |
| 2019/0162203 A1* | 5/2019 | Shinde | F02C 7/18 |
| 2022/0018293 A1* | 1/2022 | Taylor | F02C 6/08 |

* cited by examiner

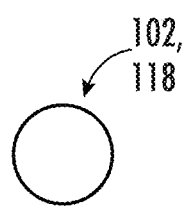
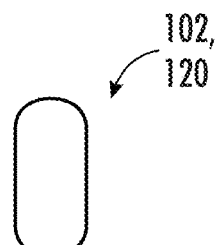
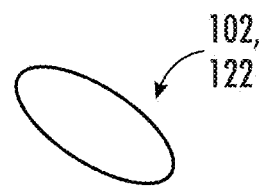
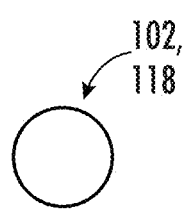
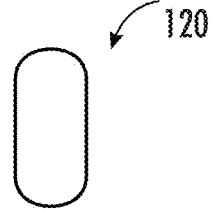
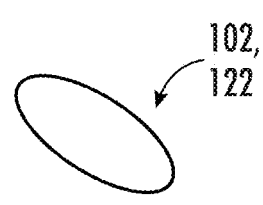
FIG. 5A     FIG. 5B     FIG. 5C

COMPRESSOR ASSEMBLY FOR A GAS TURBINE ENGINE HAVING MULTI-STAGE BLEED EXTRACTION

PRIORITY INFORMATION

The present application claims priority to Indian Provisional Patent Application No. 202411007088 filed on Feb. 2, 2024.

FIELD

The present disclosure generally relates to compressors in gas turbine engines, and more particularly relates to a compressor assembly for a gas turbine engine having bleed extraction features.

BACKGROUND

A gas turbine engine generally includes, in serial flow communication, a compressor, a combustor, and turbine. The turbine is mechanically coupled to the compressor and the three components define a turbomachinery core. The turbomachinery core is operable in a known manner to generate a flow of hot, pressurized combustion gases to operate the engine, as well as perform useful work such as providing propulsive thrust or mechanical work.

Within at least some known gas turbine engines, a portion of high-pressure air is extracted or bled from the compressor for other uses such as for turbine cooling, pressurizing bearing sumps, purge air, or aircraft environment control. This "bleed air" is bled off from the compressor using bleed scoops located in specific portions or stages of the compressor. The extracted air is then supplied to the various locations that need the air via bleed ports located around the outer periphery of the engine.

The compressor has multiple stages and the static pressure at each subsequent stage is higher than the upstream stage, with the final stage discharging air at the intended compressor discharge pressure ("CDP"). Each stage represents the investment of incrementally more mechanical work. During operation, bleed air is extracted from the compressor flow path for cabin pressurization and for turbine blade cooling.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 5A illustrates a cross-sectional view of a flow extraction pipe of a flow extraction apparatus according to an embodiment of the present disclosure;

FIG. 5B illustrates a cross-sectional view of a flow extraction pipe of a flow extraction apparatus according to another embodiment of the present disclosure;

FIG. 5C illustrates a cross-sectional view of a flow extraction pipe of a flow extraction apparatus according to yet another embodiment of the present disclosure;

DETAILED DESCRIPTION

Figure 1:
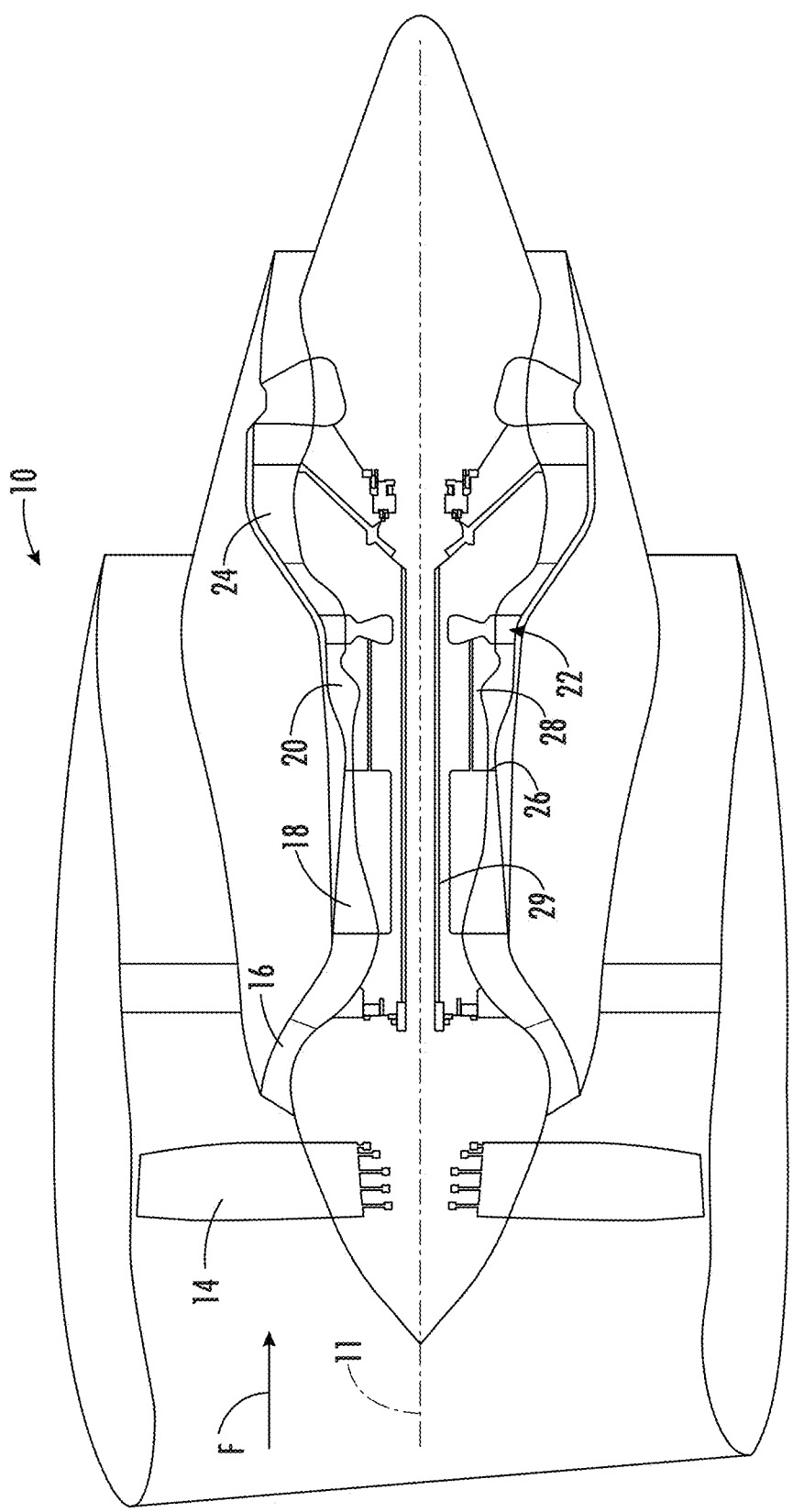
FIG. 1 is a cross-sectional, schematic view of a gas turbine engine that incorporates a compressor assembly according to an embodiment of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

As used herein, the term "rotor" refers to any component of a rotary machine, such as a turbine engine, that rotates about an axis of rotation. By way of example, a rotor may include a shaft or a spool of a rotary machine, such as a turbine engine.

As used herein, the term "stator" refers to any component of a rotary machine, such as a turbine engine, that has a coaxial configuration and arrangement with a rotor of the rotary machine. A stator may be disposed radially inward or radially outward along a radial axis in relation to at least a portion of a rotor. Additionally, or in the alternative, a stator may be disposed axially adjacent to at least a portion of a rotor.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled", "fixed", "attached to", and the like refer to both direct coupling, fixing, or attaching, as well as indirect coupling, fixing, or attaching through one or more intermediate components or features, unless otherwise specified herein.

As used herein, the terms "first", "second", "third" and so on may be used interchangeably to distinguish one component from another and are not intended to signify location or importance of the individual components.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting the a second wall/surface).

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In many engines, bleed air is extracted from the compressor flow path for cabin pressurization and for turbine blade cooling. Oftentimes, the pressure requirements leads to bleed extraction from adjacent stages to maintain desired flow rates. Bleed arrangements on adjacent stages leads to packaging related challenges. Accordingly, the present disclosure is directed to a compressor assembly for multi-stage bleed extraction that solves packaging challenges without compromising the bleed pressure recovery. For example, in an embodiment, the present disclosure solves packaging challenges by creating multi-cavities within a given bleed cavity volume with minimum complexity. In particular embodiments, multi-bleed extraction is enabled through a nested bleed arrangement in axial and circumferentially segmented directions. In further embodiments, bleeds can be actively switched alternatively to satisfy various mission requirements. For example, in an embodiment, the bleed air mass flow can be controlled by opening/closing one or more external valves through control logic based on mission requirement.

Referring now to the drawings, wherein identical numerals indicate the same elements throughout the figures, FIG. 1 illustrates a cross-sectional view of an embodiment of a gas turbine engine, also referred to herein as an engine 10, which can incorporate various aspects of the disclosed technology. As shown, the engine 10 has a fan 14, a booster 16, a high-pressure compressor or "HPC" 18, a combustor 20, a high pressure turbine or "HPT" 22, and a low pressure turbine or "LPT" 24 arranged in serial flow relationship. In operation, pressurized air from an exit 26 of the HPC 18 is mixed with fuel in the combustor 20 and ignited, thereby generating combustion gases. Some work is extracted from these gases by the HPT 22 which drives the HPC 18 via an outer shaft 28. The combustion gases then flow into the low pressure turbine 24, which drives the fan 14 and booster 16 via an inner shaft 29.

The HPC 18 includes a number of stages of blading; for example, a typical compressor may include 6-14 stages. In operation, the static air pressure is incrementally increased by each subsequent compressor stage, with the final stage discharging air at the intended compressor discharge pressure ("CDP") for subsequent flow into the combustor 20. Each compressor stage represents the investment of incrementally more mechanical work. The illustrated example shows axial stages, but the principles described herein are also applicable to centrifugal or axi-centrifugal compressors. It is also noted that air may be bled or extracted from any portion of the HPC 18, or in fact any portion of the engine 10 upstream of the point at which fuel is introduced into the air flow. The concepts described herein are especially relevant to a structure for extracting or bleeding air from an intermediate location, that is at a stage upstream of the exit 26 of the HPC 18.

Figure 2:
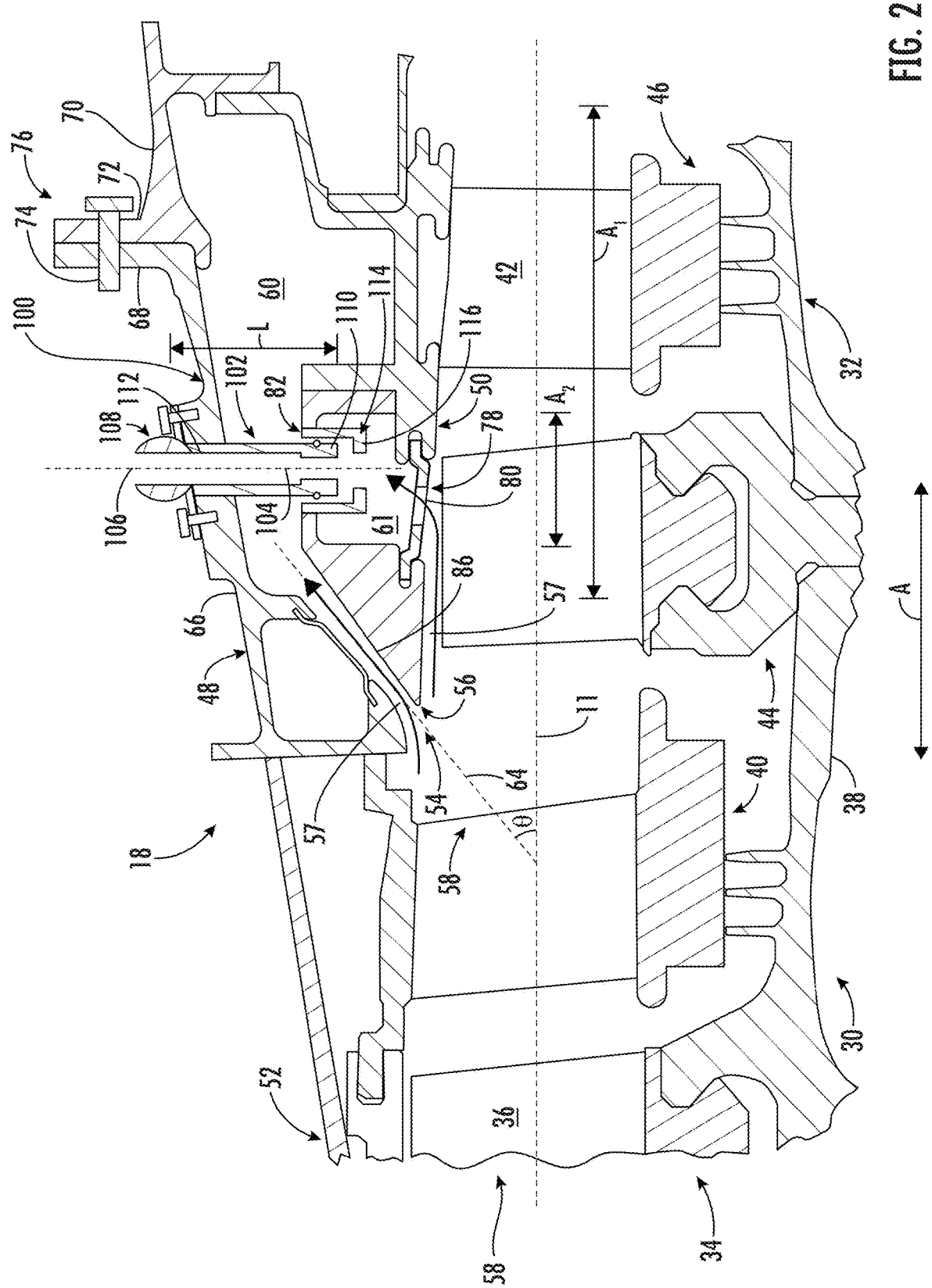
FIG. 2 is a partial, sectional view of a portion of the compressor assembly of the engine of FIG. 1, particularly illustrating a flow extraction apparatus of the compressor assembly.

Referring now to FIG. 2, a cross-sectional view of a portion of the HPC 18 incorporating an embodiment of a flow extraction apparatus 100 for multi-stage bleed extraction from the HPC 18 is illustrated. In particular, as shown, FIG. 2 illustrates only two compressor stages. For the purposes of description, one of the stages will be referred to as an "upstream stage" 30 and the other stage will be referred to as a "downstream stage" 32, with the understanding that both of the upstream and downstream stages 30, 32 are located upstream of the exit 26 of the HPC 18.

The upstream stage 30 includes a first blade row 34 of circumferentially spaced airfoil-shaped rotor blades 36 mechanically coupled to a compressor rotor 38 which is in turn mechanically coupled to the outer shaft 28 described above, and a first stator row 40 of circumferentially spaced, stationary airfoil-shaped stator vanes 42. The downstream stage 32 includes a second blade row 44 of circumferentially spaced airfoil-shaped rotor blades 36 mechanically coupled to the compressor rotor 38, and a second stator row 46 of circumferentially spaced, stationary airfoil-shaped stator vanes 42.

The HPC 18 is surrounded by a compressor casing 48 that supports the stator vanes 42. The compressor casing 48 has a radially inboard surface 50 and an opposed radially outboard surface 52. Furthermore, as shown, the compressor casing 48 includes a forward section 66 which terminates in an annular, radially extending first flange 68 at its aft end. The compressor casing 48 also includes an aft section 70 which terminates in an annular, radially extending second flange 72 at its forward end. Thus, as shown, the first and second flanges 68, 72 abut each other and are clamped together by a plurality of fasteners such as via bolts 74, thereby forming a bolted joint 76.

Still referring to FIG. 2, the flow extraction apparatus 100 utilizes the compressor casing 48 that incorporates a first bleed scoop 54 passing through the thickness of the compressor casing 48 and a second bleed scoop 78 downstream of the first bleed scoop 54. The first bleed scoop 54 may extend over all or a portion of the circumference of the compressor casing 48. In the illustrated example, the first bleed scoop 54 is a complete 360° slot around the longitudinal axis 11.

In particular embodiments, as shown, the first bleed scoop 54 extends along a first slot axis 64 which is disposed at a non-parallel, non-perpendicular angle θ to the longitudinal axis 11 of the engine 10. For example, the first slot axis 64 may be disposed at an angle of greater than 0° and less than 90° relative to a longitudinal axis of the engine 10. More particularly, in certain embodiments, the angle θ is selected to reduce pressure losses by turning bleed air through a lower angle as compared to prior art bleed scoops (that are disposed in a nearly radial orientation, e.g., 90 degrees with response to the longitudinal axis 11). This feature may be referred to as a "flat" or "low angle" bleed scoop. As used herein, the term "low angle" refers to an angle of about 65° or less. For example, the angle θ may lie in a range of about 30° to about 65°. In the illustrated example, the angle θ is about 30°.

Moreover, as shown, in the illustrated embodiment of FIG. 2, the flow extraction apparatus 100 further includes a first bleed cavity 60 (or plenum) defined in part by the compressor casing 48. Further, as shown, the first bleed cavity 60 is positioned at a first axial location $A_1$ of the engine 10. In addition, as shown, the flow extraction apparatus 100 includes a second bleed cavity 61 positioned at a second axial location $A_2$ that at least partially overlaps the first axial location $A_1$ of the first bleed cavity 60 in the axial direction A of the engine 10. Thus, as shown in the illustrated embodiment, the second bleed cavity 61 is nested within (e.g., is inside of) the first bleed cavity 60.

Furthermore, the first bleed scoop 54 is defined by wall 86. Moreover, as shown, the first bleed scoop 54 defines a first inlet 56 to the first bleed cavity 60. In addition, as shown, the second bleed scoop 78 defines a second inlet 80 to the second bleed cavity 61. Accordingly, during engine operation, a portion 57 of the compressed air from a first compressor stage of the engine 10 passes through the first inlet 56 and into the first bleed cavity 60. Moreover, as shown, a portion 59 of the compressed air from a second compressor stage of the engine 10 passes through the second inlet 80 and into the second bleed cavity 61. Air entering the first and second bleed cavities 60, 61 can be redirected or transported as necessary for various end uses by means of appropriate conduits, valves, etc.

More specifically, as shown in the illustrated embodiment, the flow extraction apparatus 100 may further include at least one bleed flow extraction pipe 102 arranged with an outlet 82 of the second bleed cavity 61. In such embodiments, the bleed flow extraction pipe 102 is configured to transport compressed air 104 in the second bleed cavity 61 through the compressor casing 48 (as indicated via arrows 104) such that the compressed air 104 can be redirected or transported as necessary for various end uses. More particularly, as shown, the bleed flow extraction pipe 102 generally defines a longitudinal axis 106 that may be disposed at an angle of about 90° relative to the longitudinal axis 11 of the engine 10.

Referring still to FIG. 2, the flow extraction apparatus 100 defines a length L extending from a first end 110 and a second end 112. Accordingly, as shown in the illustrated embodiment, the first end 110 is positioned within the second bleed cavity 61 and the second end 112 is positioned on the compressor casing 48. Moreover, as shown, at least a portion of the length L of the flow extraction apparatus 100 extends through the first bleed cavity 60. In addition, in certain embodiments, the first and second bleed cavities 60, 61 are fluidly separate from one another.

Figure 3:
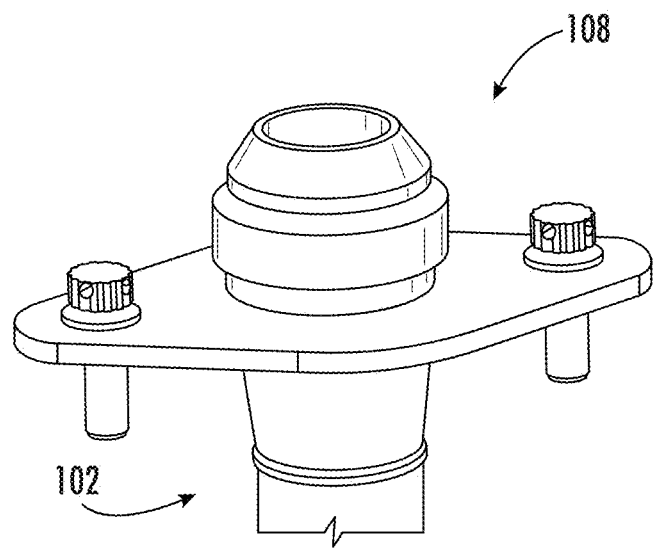
FIG. 3 is a partial, perspective view of an embodiment of a compliant joint of a flow extraction apparatus of a compressor assembly according to an embodiment of the present disclosure.

Furthermore, as shown in FIGS. 2 and 3, the bleed flow extraction pipe 102 is supported with one or more flexible/compliant couplings (e.g., a spoolie, a slip joint, or similar) to allow free thermal extension thereof. As used herein, a spoolie generally refers to a flexible joint that allows rotation about the joint. More specifically, as shown, the bleed flow extraction pipe 102 is supported by a compliant joint 108 arranged at the second end 112 of the bleed flow extraction pipe 102 on the compressor casing 48. As used herein, a flexible or compliant joint generally refers to a joint that allows relative movement of connected parts.

In further embodiments, as shown, the first end 110 of the bleed flow extraction pipe 102 extends within a recess 114 defined within the second bleed cavity 61. Thus, in such embodiments, the first end 110 of the bleed flow extraction pipe 102 is slidable within the recess 114 to allow radial movement of the bleed flow extraction pipe 102. In particular embodiments, as shown, the recess 114 may further include at least one flange 116 for limiting movement of the bleed flow extraction pipe 102 within the recess 114.

Figure 4:
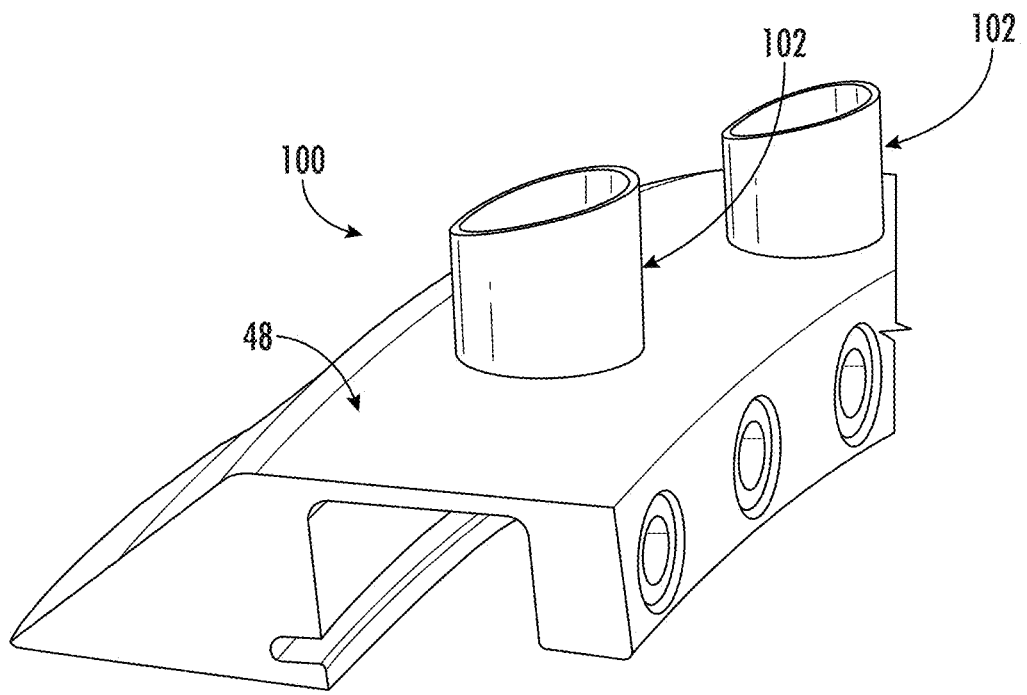
FIG. 4 is a partial, perspective view of an embodiment of a compressor assembly having a flow extraction apparatus according to an embodiment of the present disclosure, particularly illustrating a flow extraction pipe of the flow extraction apparatus.

Though FIGS. 2 and 3 illustrates a single bleed flow extraction pipe 102 for illustrative purposes, it should be understood that that the flow extraction apparatus 100 described herein may further include a plurality of discrete bleed flow extraction pipes 102 arranged circumferentially around the HPC 18, e.g., as shown in FIG. 4. In such embodiments, the discrete bleed flow extraction pipes 102 may be evenly or unevenly spaced circumferentially around the HPC 18 as desired.

Referring now to FIGS. 5A-5C, it should be understood that the bleed flow extraction pipe(s) 102 may have any suitable cross-sectional shape. For example, FIGS. 5A-5V illustrates various cross-sectional shapes of the bleed flow extraction pipe 102 at the first end 110 and the second end 112. More specifically, in an embodiment, a cross-sectional shape of the bleed flow extraction pipe 102 may be a circle 118 (FIG. 5A), a stadium 120 (FIG. 5B), or an oval 122 (FIG. 5C), as well as any other suitable shape. In addition, the cross-sectional shape of the bleed flow extraction pipe 102 may be oriented at any suitable angle with respect to the longitudinal axis 11 of the engine 10.

Figure 6:
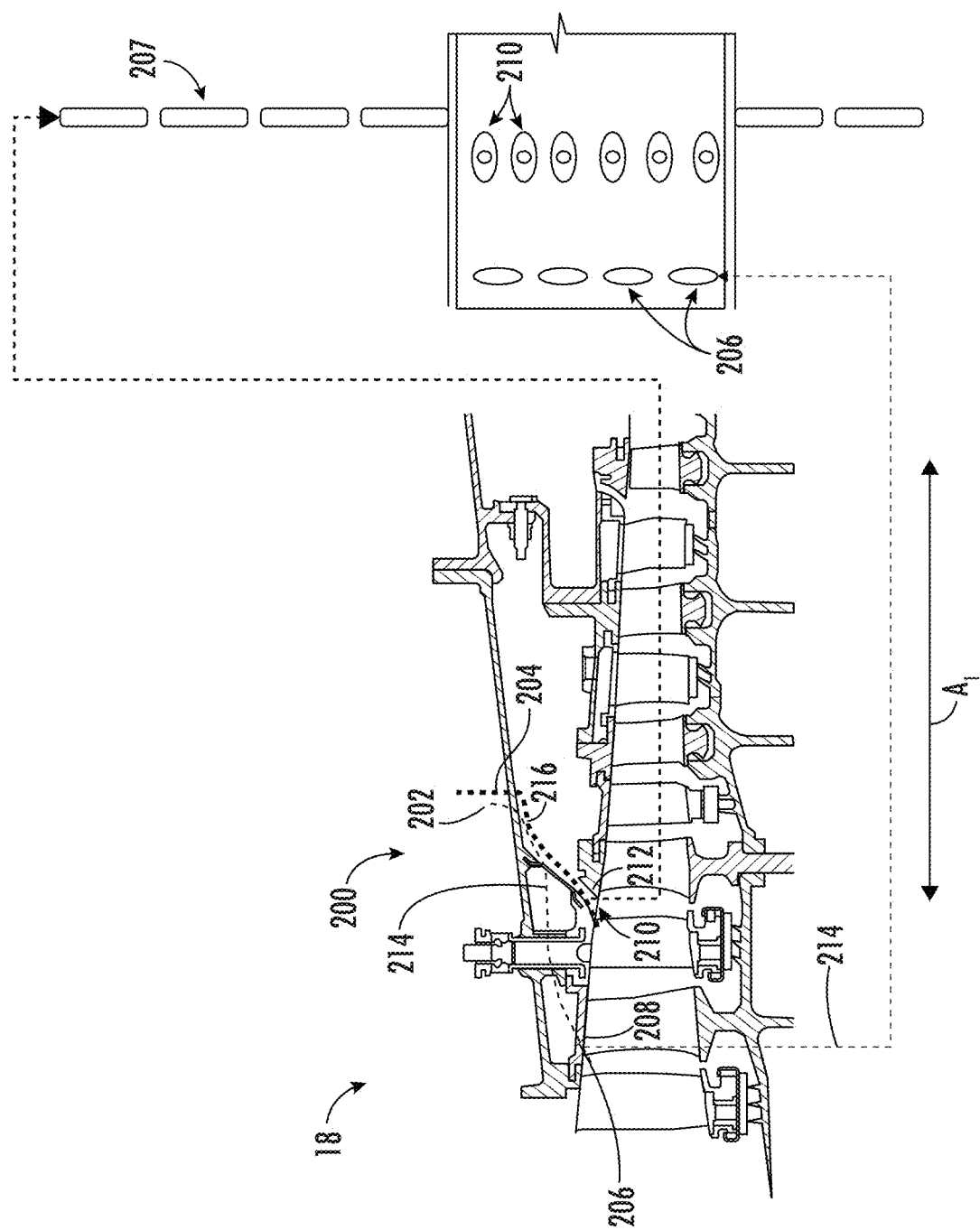
FIG. 6 is a schematic view of an embodiment of a compressor assembly having a flow extraction apparatus according to an embodiment of the present disclosure, particularly illustrating compressed air from two stages of a compressor of an engine being bled off to the flow extraction apparatus.

Referring now to FIGS. 6-9, various schematic diagrams of further embodiments of a flow extraction apparatus for multi-stage bleed extraction from the HPC 18 are illustrated. More specifically, FIG. 6 illustrates a schematic diagram of an embodiment of a flow extraction apparatus 200 in which multi-stage bleed extraction is enabled from the HPC 18 through circumferentially segmented directions according to the present disclosure. In particular, a cross-sectional view of a portion of the HPC 18 is illustrated in FIG. 6 according to an embodiment of the present disclosure, along with a roll-out view of the flow extraction apparatus 200 radially looking inward to illustrate flow of bleed air from two compressor stages. For example, as shown in FIG. 6, continuous bleed slots 207 interrupted by the segmented plenum fed by bleed ports 206 may include back-to-back bleeds (e.g., from stages three and four) on the HPC 18, with the plenums being separated by axial walls (e.g., tangentially separated). However, in other embodiments, the semi-continuous slots 207 may be replaced by individual bleed ports.

Figure 7:
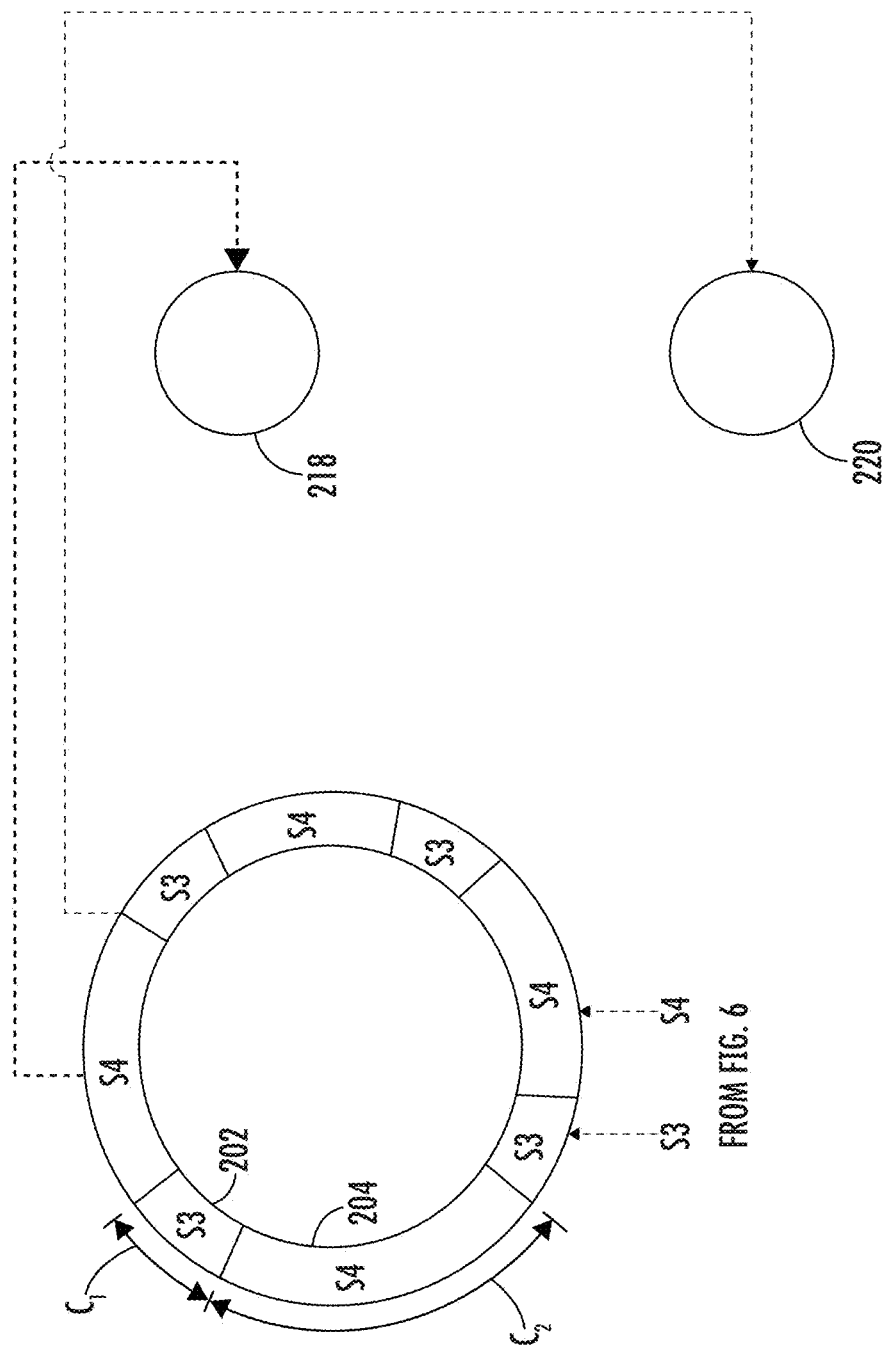
FIG. 7 is a circumferential view of an arrangement of bleed cavities of the flow extraction apparatus of FIG. 6 according to an embodiment of the present disclosure, particularly illustrating the bleed air from the two compressor stages being transferred to respective bleed ports.

Further, FIG. 7 illustrates a circumferential view of an arrangement of bleed cavities of the flow extraction apparatus 200 of FIG. 6, particularly illustrating bleed air from the two compressor stages being transferred to respective bleed ports. More specifically, as shown, the flow extraction apparatus 200 includes a first bleed cavity 202 positioned at a first axial location $A_1$ of the engine 10. In addition, as shown, the flow extraction apparatus 200 includes a second bleed cavity 204 positioned at a second axial location $A_2$ that at least partially overlaps the first axial location $A_1$ of the first bleed cavity 202 in the axial direction A of the engine 10.

Furthermore, as shown, the flow extraction apparatus 200 includes a first bleed port 206 defining a first inlet 208 to the first bleed cavity 202. In addition, as shown, the flow extraction apparatus 200 includes a second bleed scoop 210 defining a second inlet 212 to the second bleed cavity 204. Accordingly, during engine operation, a portion of compressed air 214 from a first compressor stage (e.g., stage three; S3) of the engine 10 passes through the first inlet 208 and into the first bleed cavity 202. Moreover, as shown, a portion of the compressed air 216 from a second compressor stage (e.g., stage four, S4) of the engine 10 passes through the second inlet 80 and into the second bleed cavity 204.

More specifically, as shown in FIG. 7, the first bleed cavity 202 is positioned at a first circumferential location $C_1$ and the second bleed cavity 204 is positioned at a second circumferential location $C_2$. Further, as shown in FIG. 7, the first and second circumferential locations $C_1$ and $C_2$ are arranged in an alternating pattern. Thus, the compressed air 214, 216 entering the first and second bleed cavities 202, 204 can be redirected or transported through first and second bleed ports 218, 220, respectively, as necessary for various end uses by means of appropriate conduits, valves, etc.

Figure 8:
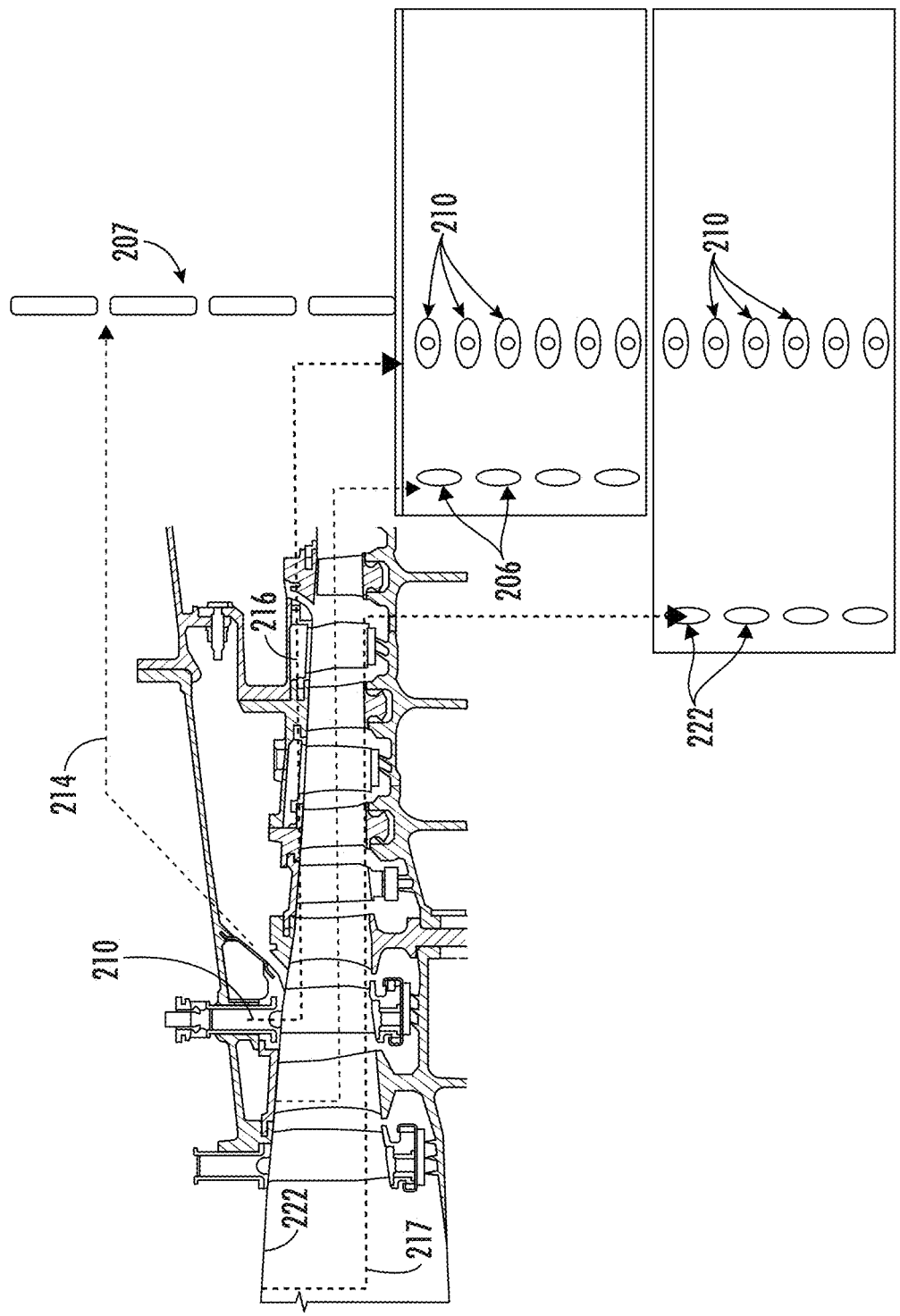
FIG. 8 is a schematic view of an embodiment of a compressor assembly having a flow extraction apparatus according to an embodiment of the present disclosure, particularly illustrating compressed air from three stages of a compressor of an engine being bled off to the flow extraction apparatus.
Figure 9:
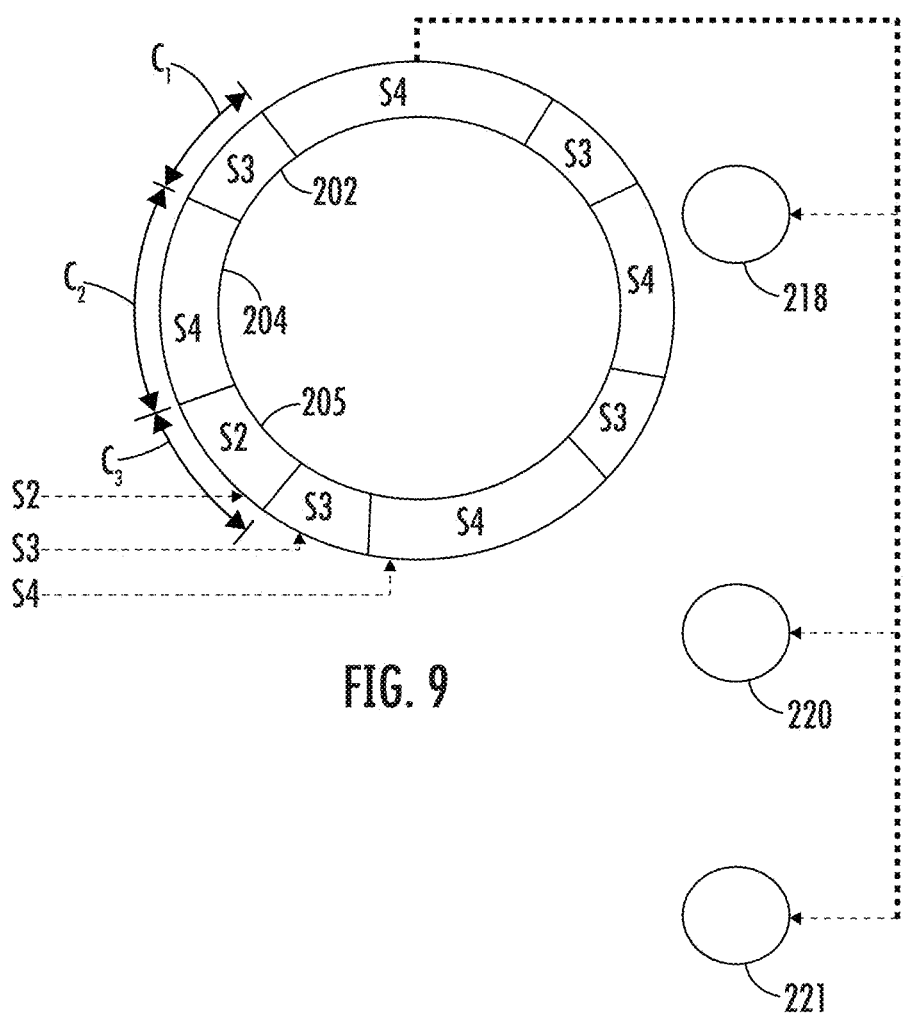
FIG. 9 is a circumferential view of an arrangement of bleed cavities of the flow extraction apparatus of FIG. 8 according to an embodiment of the present disclosure, particularly illustrating the bleed air from the three compressor stages being transferred to respective bleed ports.

Similarly, and referring now to FIGS. 8 and 9, schematic diagrams of another embodiment of the flow extraction apparatus 200 is illustrated. More specifically, FIG. 8 illustrates a schematic diagram of an embodiment of the flow extraction apparatus 200 in which multi-stage bleed extraction is enabled from the HPC 18 through circumferentially segmented directions according to the present disclosure. In particular, a cross-sectional view of a portion of the HPC 18 is illustrated in FIG. 8 according to an embodiment of the present disclosure, along with a roll-out view of the flow extraction apparatus 200 radially looking inward to illustrate flow of bleed air from three compressor stages. Similar to the embodiment shown in FIG. 6, another configuration of the flow extraction apparatus 200 is illustrated in FIG. 8, in which one or more continuous bleed slots 207 having back-to-back bleeds (e.g., from stages two, three, and four) interrupted by plenums fed by bleed ports 206 and 222 is illustrated. Furthermore, in FIGS. 6 and 8, the second bleed scoops 210 are generally illustrated as ellipses with a circle in the middle to represent VSV stems with fairing structures around them to allow the plenum air to pass between the fairings (e.g., the ellipses). Further, FIG. 9 illustrates a circumferential view of an arrangement of bleed cavities of the flow extraction apparatus 200 of FIG. 8, particularly illustrating bleed air from the three compressor stages being transferred to respective bleed ports.

Accordingly, the flow extraction apparatus 200 of FIGS. 8 and 9 is similar to the embodiment illustrated in FIGS. 6 and 7, with the addition of a third bleed port 222 positioned at a third circumferential location $C_3$ at a third compressor stage (e.g., stage two, S2). In such embodiments, as shown particularly in FIG. 9, the first, second, and third circumferential locations $C_1$, $C_2$, $C_3$ are arranged in the alternating pattern. Accordingly, the flow extraction apparatus 200 of FIGS. 8 and 9 also provides for multi-bleed extraction through a nested bleed arrangement in circumferential directions. Thus, compressed air 214, 216, 217 (i.e., bleed off take) entering the first, second, and third bleed cavities 202, 204, 205 can be redirected or transported through first, second, and third bleed ports 218, 220, 221 respectively, as necessary for various end uses by means of appropriate conduits, valves, etc.

Accordingly, the illustrated embodiment of FIGS. 8 and 9 provides high pressure compressor tandem bleed extraction at multiple stages of the HPC 18. Moreover, scooped bleed extraction from the trailing edge of stages two and three can be accomplished from bleed flow extraction pipes.

The various embodiments described herein provide many advantages not present in the prior art. In particular, the flow extraction apparatus of the present disclosure does not require an increase in the axial length of the compressor.

Furthermore, the flow extraction apparatus of the present disclosure maintains insignificant leakage to an adjacent cavity. Moreover, bleed recovery is improved and bleed port packaging challenges on various stages are improved, i.e., by not increasing the overall size requirement of the compressor.

Further aspects are provided by the subject matter of the following clauses:

A compressor assembly for an engine for multi-stage bleed extraction, the compressor assembly comprising: an annular compressor casing; a blade row mounted for rotation about a longitudinal axis inside the compressor casing; a first bleed cavity defined at a first axial location in the annular compressor casing of the engine; a second bleed cavity defined at a second axial location in the annular compressor casing that at least partially overlaps the first axial location of the first bleed cavity in an axial direction of the engine; a first bleed scoop defining a first inlet to the first bleed cavity, the first bleed scoop extending from a first compressor stage of the engine to the first bleed cavity to direct compressed air from the first compressor stage through the first inlet and into the first bleed cavity; and a second bleed scoop downstream of the first bleed scoop, the second bleed scoop defining a second inlet to the second bleed cavity, the second bleed scoop extending from a second compressor stage of the engine to the second bleed cavity to direct compressed air from the second compressor stage through the second inlet and into the second bleed cavity.

The compressor assembly of any preceding clause, wherein the second bleed cavity is nested within the first bleed cavity.

The compressor assembly of any preceding clause, further comprising at least one bleed flow extraction pipe arranged with an outlet of the second bleed cavity, the bleed flow extraction pipe configured to transport the compressed air in the second bleed cavity through an annular outer wall of the compressor assembly.

The compressor assembly of any preceding clause, wherein the bleed flow extraction pipe defines a longitudinal axis, the longitudinal axis being disposed at an angle of about 90° relative to the longitudinal axis of the engine.

The compressor assembly of any preceding clause, wherein the bleed flow extraction pipe defines a length extending from a first end and a second end, wherein the first end is positioned within the second bleed cavity, the second end is positioned at the annular outer wall of the compressor assembly, and at least a portion of the length extends through the first bleed cavity.

The compressor assembly of any preceding clause, further comprising a compliant joint arranged at second end of the bleed flow extraction pipe on the annular outer wall of the compressor assembly.

The compressor assembly of any preceding clause, wherein the first end extends within a recess defined within the second bleed cavity, and wherein the first end of the bleed flow extraction pipe is slidable within the recess to allow radial movement of the bleed flow extraction pipe.

The compressor assembly of any preceding clause, further comprising a plurality of discrete bleed flow extraction pipes arranged circumferentially around the compressor assembly.

The compressor assembly of any preceding clause, wherein a cross-sectional shape of the bleed flow extraction pipe is one of a circle, a stadium, or an oval.

The compressor assembly of any preceding clause, wherein the first bleed scoop is positioned at a first circumferential location and the second bleed scoop is positioned at a second circumferential location, and wherein the first and second circumferential locations are arranged in an alternating pattern.

The compressor assembly of any preceding clause, further comprising a third bleed scoop positioned at a third circumferential location, wherein the first, second, and third circumferential locations are arranged in the alternating pattern.

The compressor assembly of any preceding clause, wherein the first bleed scoop is defined by inboard and outboard walls of the annular compressor casing, and wherein the first bleed scoop defines a first slot axis, the first slot axis being disposed at an angle of greater than 0° and less than 90° relative to the longitudinal axis of the engine.

The compressor assembly of any preceding clause, wherein the first and second bleed cavities are fluidly separate.

A gas turbine engine, comprising: a compressor assembly, a combustor, and a turbine arranged in serial flow relationship, wherein the compressor assembly comprises: an annular compressor casing; a stator row disposed inside the compressor casing; a blade row mounted for rotation about a longitudinal axis inside the compressor casing; a first bleed cavity defined at a first axial location in the annular compressor casing of the engine; a second bleed cavity defined at a second axial location in the annular compressor casing that at least partially overlaps the first axial location of the first bleed cavity in an axial direction of the engine; a first bleed scoop defining a first inlet to the first bleed cavity, the first bleed scoop extending from a first compressor stage of the engine to the first bleed cavity to direct compressed air from the first compressor stage through the first inlet and into the first bleed cavity; and a second bleed scoop downstream of the first bleed scoop, the second bleed scoop defining a second inlet to the second bleed cavity, the second bleed scoop extending from a second compressor stage of the engine to the second bleed cavity to direct compressed air from the second compressor stage through the second inlet and into the second bleed cavity.

The gas turbine engine of any preceding clause, wherein the second bleed cavity is nested within the first bleed cavity.

The gas turbine engine of any preceding clause, further comprising at least one bleed flow extraction pipe arranged with an outlet of the second bleed cavity, the bleed flow extraction pipe configured to transport the compressed air in the second bleed cavity through an annular outer wall of the compressor assembly.

The gas turbine engine of any preceding clause, further comprising a compliant joint arranged at an outlet of the bleed flow extraction pipe on the annular outer wall of the compressor assembly.

The gas turbine engine of any preceding clause, wherein the bleed flow extraction pipe extends from a first end positioned within the second bleed cavity and a second end positioned at the annular outer wall of the compressor assembly, the first end extending within a recess defined within the second bleed cavity, and wherein the first end of the bleed flow extraction pipe is slidable within the recess to allow radial movement of the bleed flow extraction pipe.

The gas turbine engine of any preceding clause, further comprising a plurality of discrete bleed flow extraction pipes arranged circumferentially around the compressor assembly.

The gas turbine engine of any preceding clause, wherein the first bleed scoop is positioned at a first circumferential location and the second bleed scoop is positioned at a second circumferential location, and wherein the first and second circumferential locations are arranged in an alternating pattern.

This written description uses examples to disclose the present technology, including the best mode, and also to enable any person skilled in the art to practice the present technology, including making and using any devices or systems and performing any incorporated methods. The patentable scope of the present technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A compressor assembly for an engine for multi-stage bleed extraction, the compressor assembly comprising:
   an annular compressor casing;
   a blade row mounted for rotation about a longitudinal axis inside the annular compressor casing;
   a first bleed cavity defined at a first axial location in the annular compressor casing of the engine;
   a second bleed cavity defined at a second axial location in the annular compressor casing that at least partially overlaps the first axial location of the first bleed cavity in an axial direction of the engine, wherein the second bleed cavity is nested within the first bleed cavity;
   a first bleed scoop defining a first inlet to the first bleed cavity, the first bleed scoop extending from a first compressor stage of the engine to the first bleed cavity to direct compressed air from the first compressor stage through the first inlet and into the first bleed cavity; and
   a second bleed scoop downstream of the first bleed scoop, the second bleed scoop defining a second inlet to the second bleed cavity, the second bleed scoop extending from a second compressor stage of the engine to the second bleed cavity to direct compressed air from the second compressor stage through the second inlet and into the second bleed cavity; and
   a bleed flow extraction pipe arranged with an outlet of the second bleed cavity, the bleed flow extraction pipe configured to transport the compressed air in the second bleed cavity through an annular outer wall of the compressor assembly, and
   wherein the bleed flow extraction pipe defines a length extending from a first end and a second end, wherein the first end is positioned within the second bleed cavity, the second end is positioned at the annular outer wall of the compressor assembly, and at least a portion of the length extends through the first bleed cavity.

2. The compressor assembly of claim 1, further comprising a compliant joint arranged at the second end of the bleed flow extraction pipe on the annular outer wall of the compressor assembly.

3. The compressor assembly of claim 1, wherein the first end extends within a recess defined within the second bleed cavity, and wherein the first end of the bleed flow extraction pipe is slidable within the recess to allow radial movement of the bleed flow extraction pipe.

4. The compressor assembly of claim 1, further comprising a plurality of discrete bleed flow extraction pipes arranged circumferentially around the compressor assembly.

5. The compressor assembly of claim 1, wherein a cross-sectional shape of the bleed flow extraction pipe is one of a circle, a stadium, or an oval.

6. The compressor assembly of claim 1, wherein the first bleed scoop is positioned at a first circumferential location and the second bleed scoop is positioned at a second circumferential location, and wherein the first circumferential location and the second circumferential location are arranged in an alternating pattern.

7. The compressor assembly of claim 6, further comprising a third bleed scoop positioned at a third circumferential location, wherein the first circumferential location, the second circumferential location, and the third circumferential location are arranged in the alternating pattern.

8. The compressor assembly of claim 1, wherein the first bleed scoop is defined by inboard and outboard walls of the annular compressor casing, and wherein the first bleed scoop defines a first slot axis, the first slot axis being disposed at an angle of greater than 0° and less than 90° relative to the longitudinal axis of the engine.

9. The compressor assembly of claim 1, wherein the first bleed cavity and the second bleed cavity are fluidly separate from one another.

10. A gas turbine engine, comprising:
    a compressor assembly, a combustor, and a turbine arranged in serial flow relationship, wherein the compressor assembly comprises:
    an annular compressor casing;
    a stator row disposed inside the annular compressor casing;
    a blade row mounted for rotation about a longitudinal axis inside the annular compressor casing;
    a first bleed cavity defined at a first axial location in the annular compressor casing of the engine;
    a second bleed cavity defined at a second axial location in the annular compressor casing that at least partially overlaps the first axial location of the first bleed cavity in an axial direction of the engine, wherein the second bleed cavity is nested within the first bleed cavity;
    a first bleed scoop defining a first inlet to the first bleed cavity, the first bleed scoop extending from a first compressor stage of the engine to the first bleed cavity to direct compressed air from the first compressor stage through the first inlet and into the first bleed cavity; and
    a second bleed scoop downstream of the first bleed scoop, the second bleed scoop defining a second inlet to the second bleed cavity, the second bleed scoop extending from a second compressor stage of the engine to the second bleed cavity to direct compressed air from the second compressor stage through the second inlet and into the second bleed cavity;
    a bleed flow extraction pipe arranged with an outlet of the second bleed cavity, the bleed flow extraction pipe configured to transport the compressed air in the second bleed cavity through an annular outer wall of the compressor assembly; and
    a compliant joint arranged at an outlet of the bleed flow extraction pipe on the annular outer wall of the compressor assembly.

11. The gas turbine engine of claim 10, further comprising a plurality of discrete bleed flow extraction pipes arranged circumferentially around the compressor assembly.

12. The gas turbine engine of claim 10, wherein the first bleed scoop is positioned at a first circumferential location and the second bleed scoop is positioned at a second circumferential location, and wherein the first circumferential location and the second circumferential location are arranged in an alternating pattern.

13. A gas turbine engine, comprising:
a compressor assembly, a combustor, and a turbine arranged in serial flow relationship, wherein the compressor assembly comprises:
an annular compressor casing;
a stator row disposed inside the annular compressor casing;
a blade row mounted for rotation about a longitudinal axis inside the annular compressor casing;
a first bleed cavity defined at a first axial location in the annular compressor casing of the engine;
a second bleed cavity defined at a second axial location in the annular compressor casing that at least partially overlaps the first axial location of the first bleed cavity in an axial direction of the engine, wherein the second bleed cavity is nested within the first bleed cavity;
a first bleed scoop defining a first inlet to the first bleed cavity, the first bleed scoop extending from a first compressor stage of the engine to the first bleed cavity to direct compressed air from the first compressor stage through the first inlet and into the first bleed cavity; and
a second bleed scoop downstream of the first bleed scoop, the second bleed scoop defining a second inlet to the second bleed cavity, the second bleed scoop extending from a second compressor stage of the engine to the second bleed cavity to direct compressed air from the second compressor stage through the second inlet and into the second bleed cavity; and
a bleed flow extraction pipe arranged with an outlet of the second bleed cavity, the bleed flow extraction pipe configured to transport the compressed air in the second bleed cavity through an annular outer wall of the compressor assembly, wherein the bleed flow extraction pipe extends from a first end positioned within the second bleed cavity and a second end positioned at the annular outer wall of the compressor assembly, the first end extending within a recess defined within the second bleed cavity, and wherein the first end of the bleed flow extraction pipe is slidable within the recess to allow radial movement of the bleed flow extraction pipe.

14. The gas turbine engine of claim 13, further comprising a plurality of discrete bleed flow extraction pipes arranged circumferentially around the compressor assembly.

15. The gas turbine engine of claim 13, wherein the first bleed scoop is positioned at a first circumferential location and the second bleed scoop is positioned at a second circumferential location, and wherein the first circumferential location and the second circumferential location are arranged in an alternating pattern.

* * * * *